United States Patent
Lee et al.

(10) Patent No.: US 7,331,018 B2
(45) Date of Patent: Feb. 12, 2008

(54) SYSTEM AND METHOD FOR CUSTOMIZING A DATA DISPLAY USING A PRESENTATION PROFILE

(75) Inventors: Patrick R. Lee, Bolingbrook, IL (US); Shyhshiun Chen, Naperville, IL (US); Ching-Yi Kung, Naperville, IL (US)

(73) Assignee: Computer Associates Think, Inc., Islandia, NY (US)

( * ) Notice: Subject to any disclaimer, the term of this patent is extended or adjusted under 35 U.S.C. 154(b) by 517 days.

(21) Appl. No.: 10/888,120

(22) Filed: Jul. 9, 2004

(65) Prior Publication Data

US 2005/0119990 A1 Jun. 2, 2005

Related U.S. Application Data

(60) Provisional application No. 60/486,068, filed on Jul. 10, 2003.

(51) Int. Cl.
*G06F 3/00* (2006.01)
*G06F 3/14* (2006.01)

(52) U.S. Cl. ............... 715/747; 715/744; 715/733; 715/765; 715/513; 715/523

(58) Field of Classification Search ........ 715/744–747, 715/760, 764, 765, 866, 500, 513, 523, 733, 715/501.1; 707/10; 709/203, 217, 219
See application file for complete search history.

(56) References Cited

U.S. PATENT DOCUMENTS

| | | | |
|---|---|---|---|
| 6,014,638 A | 1/2000 | Burge et al. | |
| 6,269,275 B1 | 7/2001 | Slade | |
| 6,407,754 B1 | 6/2002 | Hetherington et al. | |
| 6,996,768 B1 * | 2/2006 | Elo et al. ............... | 715/500 |
| 7,080,077 B2 * | 7/2006 | Ramamurthy et al. ....... | 707/9 |
| 2001/0042016 A1 * | 11/2001 | Muyres et al. ............ | 705/14 |
| 2002/0010716 A1 | 1/2002 | McCartney et al. | |

(Continued)

FOREIGN PATENT DOCUMENTS

GB    2 381 340 A    4/2003

(Continued)

OTHER PUBLICATIONS

Notification of Transmittal of the International Search Report and the Written Opinion of the International Searching Authority, or the Declaration—Form PCT/ISA/220 (3 pages); PCT International Search Report—Form PCT/ISA/210 (4 pages), and Written Opinion of the International Searching Authority—Form PCT/ISA/237 (5 pages), PCT/US2004/022244, mailed Oct. 22, 2004.

(Continued)

*Primary Examiner*—X. L. Bautista
(74) *Attorney, Agent, or Firm*—Pillsbury Winthrop Shaw Pittman, LLP (57) ABSTRACT

A method for customizing a data display using a presentation profile comprises retrieving extensible Markup Language (XML) data in response to a request from a client. A presentation profile is loaded based on at least one characteristic of the client. The XML data is formatted into a data display based on the presentation profile and the data display is communicated to the client.

13 Claims, 5 Drawing Sheets

U.S. PATENT DOCUMENTS

| | | | |
|---|---|---|---|
| 2002/0120685 A1* | 8/2002 | Srivastava et al. | 709/203 |
| 2003/0151621 A1* | 8/2003 | McEvilly et al. | 345/744 |
| 2003/0216929 A1* | 11/2003 | Brockway et al. | 705/1 |
| 2004/0003402 A1* | 1/2004 | McKenna | 725/46 |
| 2004/0030741 A1* | 2/2004 | Wolton et al. | 709/202 |
| 2004/0043758 A1* | 3/2004 | Sorvari et al. | 455/414.1 |
| 2004/0049737 A1* | 3/2004 | Hunt et al. | 715/513 |
| 2004/0080514 A1* | 4/2004 | Dorwart | 345/581 |
| 2004/0100490 A1* | 5/2004 | Boston et al. | 345/744 |
| 2004/0128618 A1* | 7/2004 | Datta | 715/513 |

FOREIGN PATENT DOCUMENTS

WO     WO 00/73941 A2    12/2000

OTHER PUBLICATIONS

Floyd, Michael, "Beyond HTML, Building an XML Workbench," XP-001130848, May 1999, 4 pgs., <www.webtechniques.com>.

Wei-Ying, et al., "A Framework for Adaptive Content Delivery in Heterogeneous Network Environments", Hewlett-Packard Laboratories, XP-002168331, Jan. 24, 2000, 14 pgs.

* cited by examiner

SYSTEM AND METHOD FOR CUSTOMIZING A DATA DISPLAY USING A PRESENTATION PROFILE

RELATED APPLICATION

This application claims the priority under 35 U.S.C. §119 of provisional application Ser. No. 60/486,068 filed Jul. 10, 2003.

TECHNICAL FEILD

This disclosure relates generally to the field of data processing, and more particularly to a system and method for customizing a data display using a presentation profile.

BACKGROUND

Current data providers typically provide display parameters with the requested data. These display parameters include title, icons, chart format, various links and other information used to present the data to a client in a more readable form. Typically, the client cannot customize this presentation. Further, conventional systems normally require that the data provider concurrently provides the data and the display parameters.

SUMMARY

This disclosure provides a system and method for customizing a data display using a presentation profile. In one embodiment, a method for customizing a data display comprises retrieving extensible Markup Language (XML) data in response to a request from a client. A presentation profile is loaded based on at least one characteristic of the client. The XML data is formatted into a data display based on the presentation profile and the data display is communicated to the client. The details of one or more embodiments of the disclosure are set forth in the accompanying drawings and the description below. Particular features, objects, and advantages of the disclosure will be apparent from the description and drawings and from the claims.

DETAILED DESCRIPTION

Figure 1:
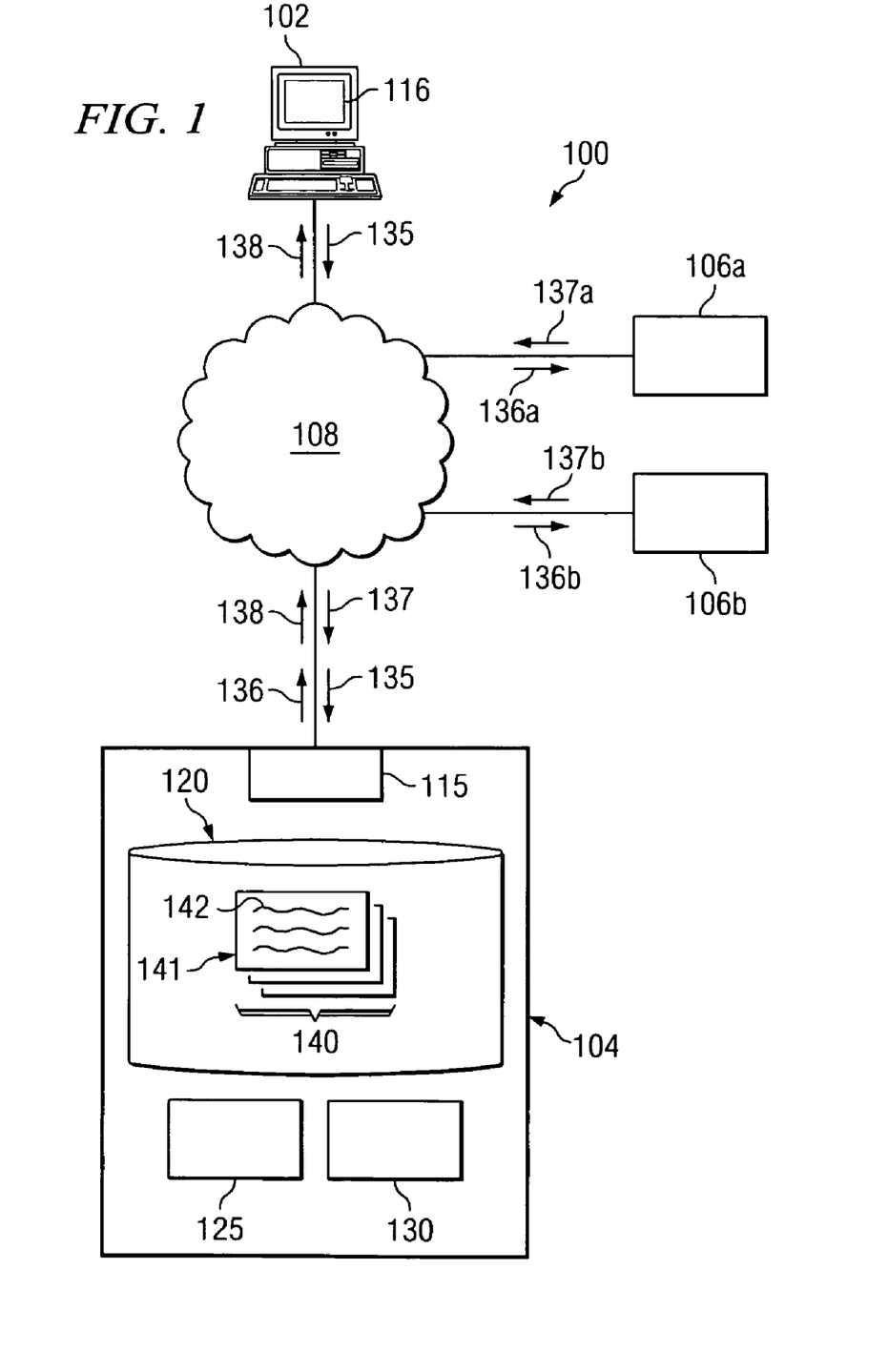
FIG. 1 is a block diagram illustrating a system for customizing a data display using a presentation profile according to one embodiment of the present disclosure.

FIG. 1 illustrates a system 100 for customizing a data display using a presentation profile 141. At a high level, system 100 is a client/server environment comprising at least one client 102, a server 104, and one or more data providers 106, but may also be a standard computing environment or any other suitable environment. In general, system 100 comprises a system for providing client 102 with data display 216 (illustrated in FIG. 2) customized according to an associated presentation profile 141, normally stored on server 104. For example, system 100 may comprise an enterprise security management system that allows server 104 to present a client-customized display of security alerts, security components, or any other suitable security data to client 102. System 100 retrieves the appropriate data 137 from data provider 106 and automatically processes the retrieved data 137 into a format specified in presentation profile 141. The term "automatically," as used herein, generally means that the appropriate processing is substantially performed by system 100. It should be understood that "automatically" further contemplates any suitable user interaction with system 100 without departing from the scope of this disclosure. The term "dynamically," as used herein, generally means that certain processing is determined, at least in part, at run-time based on one or more variables. In one embodiment, system 100 allows clients 102 to specify how server 104 presents the requested data. Moreover, system 100 allows data providers 106 to communicate smaller output—for example, raw data without display parameters—resulting in reduced need for bandwidth.

Each client 102 may include input devices, output devices, mass storage media, processors, memory, interfaces, communication ports, or other appropriate components for communicating client requests 135 to server 104 and viewing the generated output. It will be understood that there may be any number of clients 102 coupled to server 104. As used in this document, client 102 is intended to encompass a personal computer, workstation, network computer, kiosk, wireless data port, personal data assistant (PDA), one or more processors within these or other devices, or any other suitable processing device. Moreover, "client 102" and "user of client 102" may be used interchangeably without departing from the scope of this disclosure. For example, client 102 may comprise a computer that includes an input device, such as a keypad, touch screen, mouse, or other device that can accept information, and an output device that conveys information associated with the operation of server 104 or clients 102, including digital data, visual information, or presentation profiles 141. Both the input device and output device may include fixed or removable storage media such as a magnetic computer disk, CD-ROM, or other suitable media to both receive input from and provide output to users of clients 102 through a portion of the customized data display, namely graphical user interface (GUI) 116.

GUI 116 comprises a graphical user interface operable to allow the user of client 102 to interface with system 100 to receive data from data providers 106 in a predetermined format. Generally, GUI 116 provides the user of client 102 with an efficient and user-friendly presentation of data provided by system 100, such as charts and tables. GUI 116 may comprise a plurality of displays having interactive fields, pull-down lists, and buttons operated by the user. In one example, GUI 116 presents multiple charts and tables according to specification by client 102 and receives commands from client 102. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 104 can accept data from client 102 via the web browser (e.g., Microsoft Internet Explorer or Netscape Navigator) and return the appropriate HTML or eXtensible Markup Language (XML) responses.

Server 104 includes memory 120 and processor 125 and comprises an electronic computing device operable to receive, transmit, process and store data associated with system 100. For example, server 104 may comprise a general-purpose personal computer (PC), a Macintosh, a workstation, a Unix-based computer, a server computer, or any other suitable device. According to one embodiment, server 104 may comprise a web server. In short, server 104 may comprise software and/or hardware in any combination suitable to present client 102 with a customized view of data from one or more data providers 106. For example, if server 104 comprises a security server, then security server 104 may provide different security views, reports of security infrastructure, visualizations and reports of security status, reports of various security products, remote control of security, integration with internal or third party security, and any other suitable functionality.

FIG. 1 only provides one example of computers that may be used with the disclosure. For example, although FIG. 1 provides one example of server 104 that may be used with the disclosure, server 104 can be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device. Computer server 104 may be adapted to execute any operating system including UNIX, Windows, Linux, or any other suitable operating system.

Server 104 includes interface 115 for communicating with other computer systems, such as client 102 and data provider 106, over network 108 in a client-server or other distributed environment. In certain embodiments, server 104 receives presentation profiles 141 from network 108 for storage in memory 120. Network 108 facilitates wireless or wireline communication between computer server 104 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 108. More specifically, interface 115 may comprise software supporting one or more communications protocols associated with communications network 108 or hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 120 includes at least presentation profile repository 140, but may also include any other appropriate data, such as HTML pages or retrieved XML data 137. Presentation profile repository 140 may be any table, database, file, or object that stores or includes one or more customizable presentation profiles 141. Presentation profile repository 140 may receive presentation profiles 141 through interface 115, from another process running on server 104, a user, or any other appropriate technique. Repository 140 may be of any suitable format including XML documents, flat files, comma-separated-value (CSV) files, SQL tables, relational database tables, and any other format operable to store presentation profiles 141.

Presentation profile 141 is associated with client 102 based on any appropriate characteristic. For example, server 104 may associate presentation profile 141 based on a selection by client 102 or identification of a user group, client ID, IP address, logical location, a security level, or any other suitable characteristic of client 102. In general, presentation profile 141 provides an interface between client 102 and server 104 that automatically formats requested data according to specified display parameters. In one embodiment, this allows presentation information to be stored server-side, thereby at least partially removing the need for data providers 106 to communicate this data and, subsequently, reducing network traffic. In short, presentation profile 141 comprises any file including at least one presentation attribute 142, which describes certain presentation information and/or display characteristics, and operable to be processed by server 104. Presentation profile 141 may be created by client 102, a third party software vendor, or any other appropriate user of any computer in system 100 or loaded from a default profile. Presentation profile 141 may be in any electronic format such as, for example, an XML document, comma separated value (CSV) file, EFT record, name-value pair, or any other appropriate data format. In one embodiment, XML is used because it is easily portable, human-readable, and customizable.

Presentation profile 141 includes one or more presentation attributes 142. In general, attributes 142 include various data characteristics and presentation parameters that allow server 104 to customize the presentation of data to client 102. Attributes 142 may comprise chart attributes, table attributes, link rules, font sizes, colors, background, icons, title text, and any other appropriate visual component. For example, presentation profile 141 may comprise the following high-level logical format with the respective presentation attributes 142:

Title Text

Client 102 can specify the text string to be shown as the title of the one or more reports generated from the retrieved data. The text may be enclosed by TITLE_TEXT XML tag, for example, <TITLE_TEXT>AntiVirus Deployment Report</TITLE_TEXT>

Title Icon

Client 102 can specify the icon file name which will be used along with report title. The value of icon file may be enclosed by TITLE_ICON XML tag, for example, <TITLE_ICON>eFW-R16.gif</TITLE_ICON>

Chart

Client 102 can specify Y-axis title as content of this CHART XML tag, with other chart attributes 142, such as chart width, height, default type (bar, pie, line) and alignment position for chart (whether a XSLT presentation profile chart should be in left or top, table should be right or bottom). For example, <CHART DefaultType="PIE" Align="LeftRight">Deployment Count By Operating System</CHART>

Table

Client 102 can specify the table width (optional) with all the column information. The content of element 'COLUMN' is used as column header text with its data type and whether this column can be used as chart's Y-axis data. If element 'TABLE' is used, there normally is at least one element 'COLUMN' within it. For example,

```
<TABLE width="340">
  <COLUMN DataType="string">Operating System</COLUMN>
  <COLUMN DataType="unit32" YAxisData="y">Count</COLUMN>
</TABLE>
```

Link Rule

Client 102 can specify which column (or specific row data) to build a link for and how you want to build it. If the "Match" attribute 142 is "DataValue" then the attribute "Criteria" could be a valid regular expression. In the following example, the attribute of RULE tag is used to specify that server 104 should build link for column 1 data, and the content of RULE tag is the format specifier used to create the link.

```
>LINK_RULE Match="ColumnNumber"
  Criteria="1">http://@node:@port/SMP/Servlet/epPCMServlet?Auditname=@p1
&Auditnode=@p2</LINK_RULE>
``` where @p1 is for column 1 data and @p2 is for column 2 data. Further, there are two other variables @node and @port available, which stand for the node name and port number of data provider 106 or the resident agent.

It will be understood that the preceding example attributes 142 are for illustration purposes only. Presentation profile 141 may be in any logical or physical format operable to be processed by server 104 and include none, some, or all of the illustrated attributes 142, as well additional attributes 142 or other data structuring not listed.

Server 104 also includes processor 125. Processor 125 executes instructions and manipulates data to perform the operations of server 104 such as, for example, a central processing unit (CPU), an application specific integrated circuit (ASIC) or a field-programmable gate array (FPGA). Although FIG. 1 illustrates a single processor 125 in server 104, multiple processors 125 may be used according to particular needs, and reference to processor 125 is meant to include multiple processors 125 where applicable. In the embodiment illustrated, processor 125 executes presentation engine 130, which processes external or remote data based on product profiles 141. Presentation engine 130 could include any hardware, software, firmware, or combination thereof operable to receive a client request 131 from client 102, retrieve data 137 from data provider 106 on a target machine in a suitable format, and automatically transform the data such that any generic web browser, such as GUI 116, may access it. For example, presentation engine 130 may be written in any appropriate computer language including C, C++, Java, J#, Visual Basic, Perl, and others. It will be understood that while presentation engine 130 is illustrated as a single multi-tasked module, the features and functionality performed by this engine may be performed by multiple modules such as, for example, a retrieving module, a transforming module, and an editing module. Moreover, while not illustrated, presentation engine 130 may comprise a child or sub-module of another local or remote software application. In one embodiment, presentation engine 130 loads presentation profile 141 and automatically formats data 137 retrieved from the target machine by one or more data providers 106.

Data provider 106 typically comprises a third party web server or an enterprise agent residing on a target machine. It will be understood that the target machine or process may be remote or on-site; further, the target machine may represent a separate process running on server 104 or client 102 without departing from the scope of this disclosure. In other words, data provider 106 is any module or component that receives requests 136 from presentation engine 130 and retrieves data 137, normally residing on the target machine. In certain embodiments, data 137 is in XML format. Once the data has been gathered, data provider 106 may communicate data 137 to server 104 or server 104 may retrieve data 137 from data provider 106, as appropriate.

In one aspect of operation, client 102 communicates a client request 135 to server 104. Before client request 135 is received by server 104, system 100 may require that client 102 log on to server 104 as appropriate. For example, if system 100 comprises an enterprise security management system, then server 104 may verify or authenticate client 102 before accepting client request 135. Once server 104 receives client request 135, server 104 loads presentation profile 141 associated with requesting client 102. According to one embodiment, if there is no presentation profile 141 associated with requesting client 102, then server 104 may load a default presentation profile 141.

Server 104 then processes client request 135 to retrieve the requested XML data 137 from data providers 106. For example, if server 104 comprises web server components, then server 104 may use the Apache Jakarta Tomcat servlet engine or other similar component to process portions of client request 135. Based upon client request 135, presentation engine 130 communicates server request 136 to data provider 106 in order to retrieve the desired data 137. According to one embodiment, there may be more than one data provider 106 necessary to fulfill client request 135. Accordingly, as illustrated in FIG. 1, a first data provider 106a may receive a first server request 136a and a second data provider 106b may receive a second, and occasionally different, server request 136b. After suitable processing, the requisite data provider 106 communicates data 137. Once the output data 137 is received by server 104, presentation engine 130 initiates the XSLT transformation procedure using the loaded presentation profile 141. Based on various attributes 142 defined in presentation profile 141, presentation engine 130 customizes the resulting data display 116 for client 102. According to particular embodiments, this customization procedure is, at least in part, implemented using the extensibility mechanism in XSLT. Server 104 then communicates customized data display 116 to client 102 using any appropriate protocol such as, for example, the HTTP/HTTPS protocol.

Figure 2A:
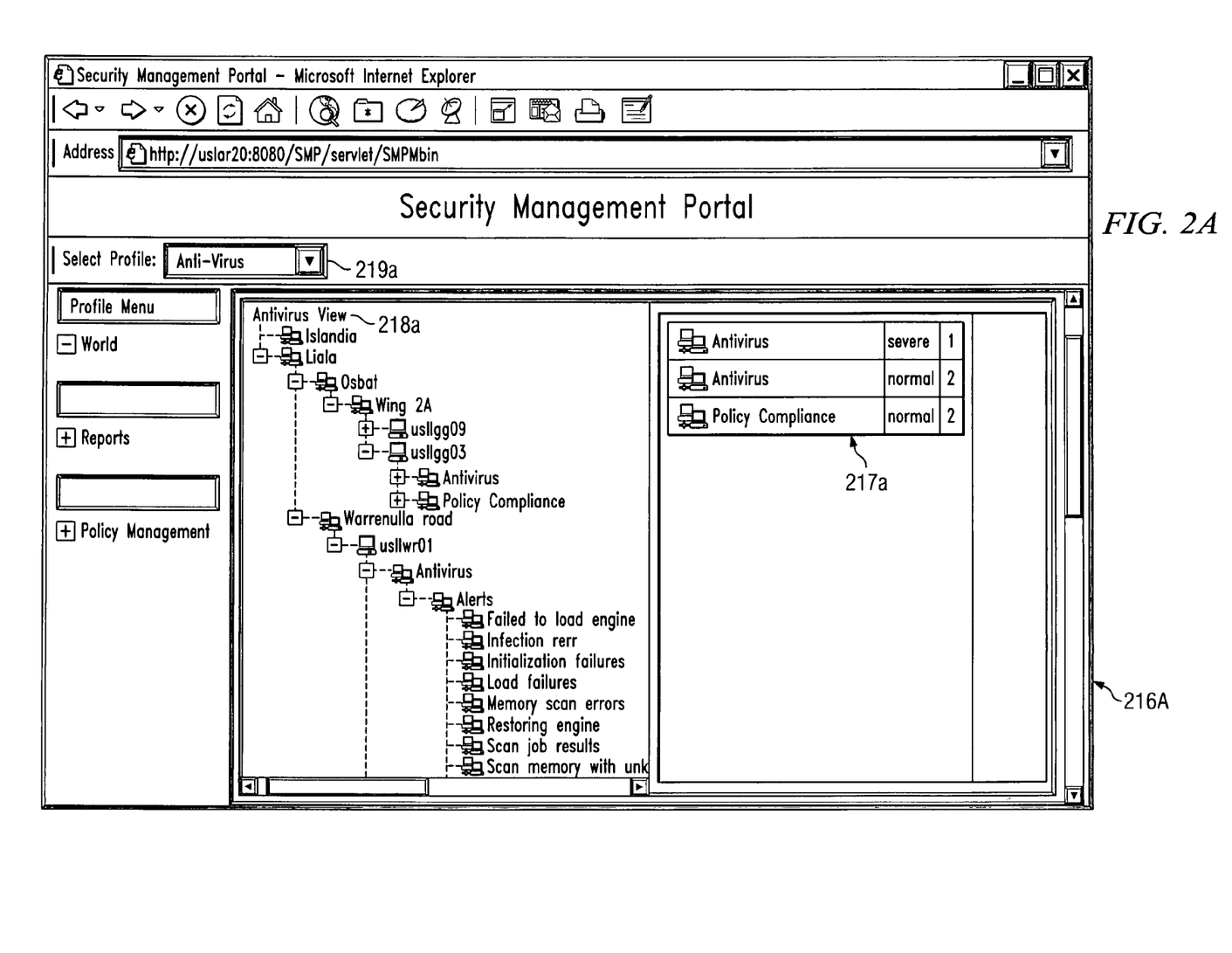
FIGS. 2A-C illustrate various examples of a customized data display presented by the system in FIG. 1.
Figure 2B:
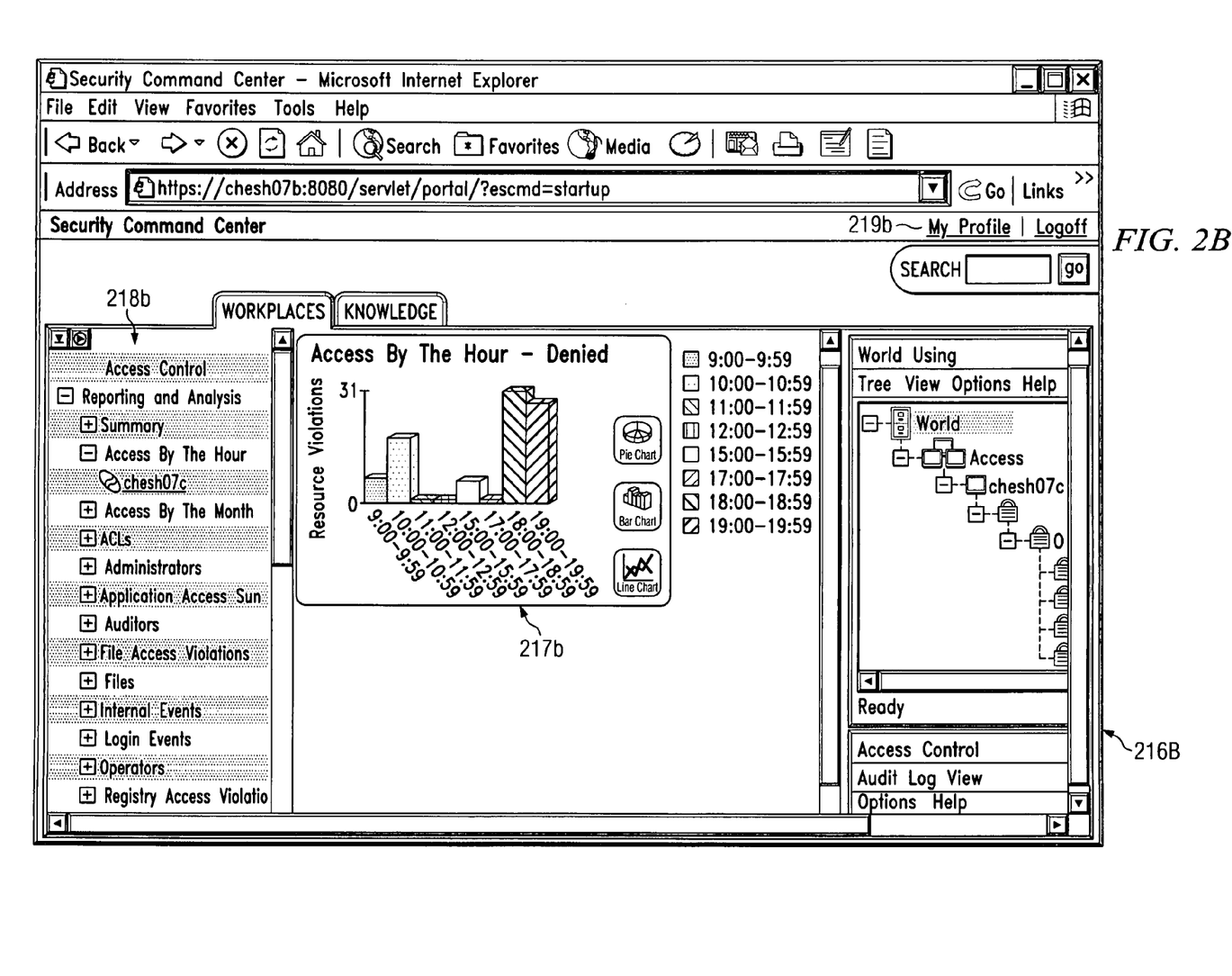
Figure 2C:
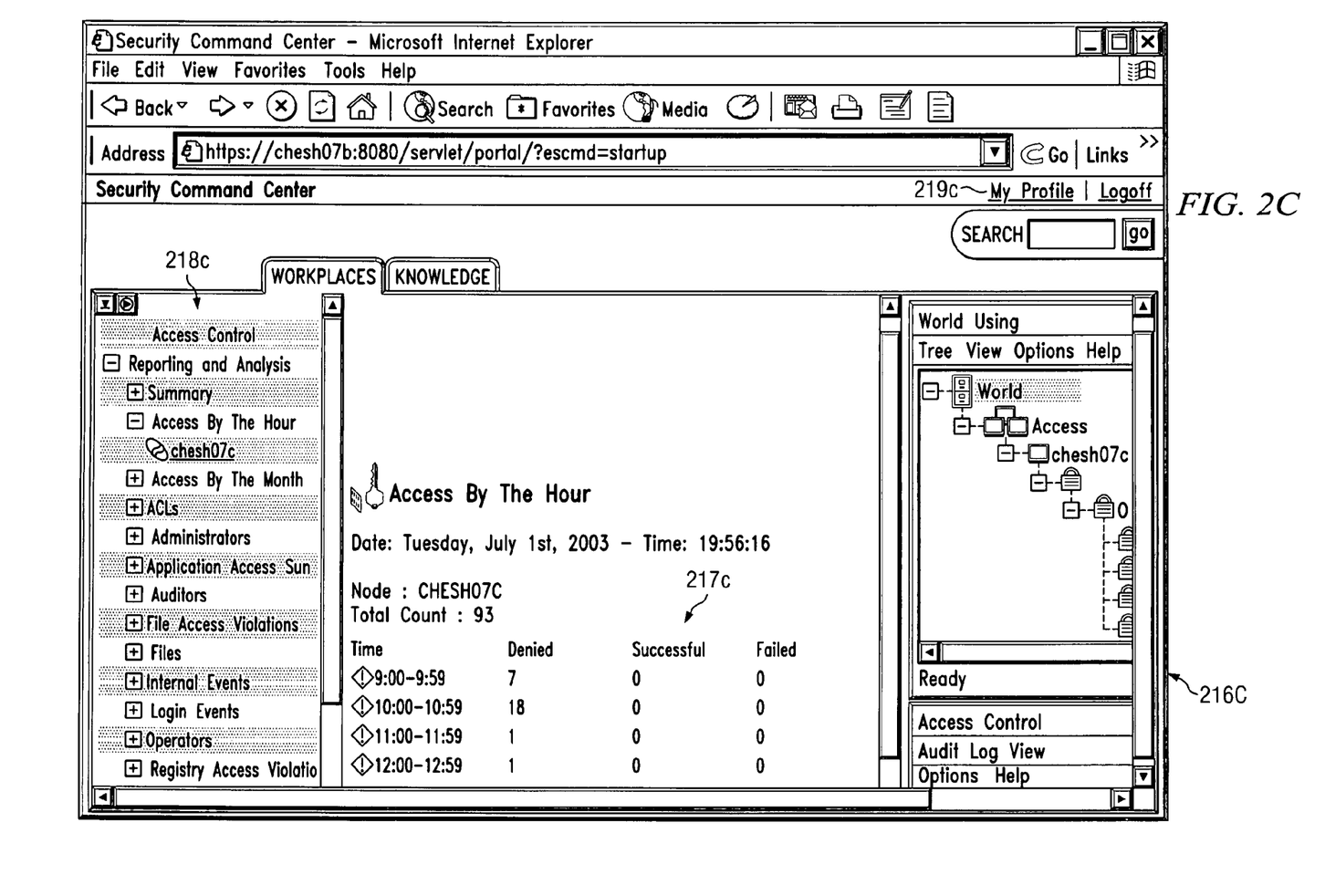

FIGS. 2A-C illustrate various examples of customized data display 216. Often, data display 216 is presented to client 102 using GUI 116. In general, data display 216 presents data from data providers 106 in a format defined, and often specified, prior to client 102 submitting client request 135, by client 102. FIG. 2A illustrates data display 216 including display elements table 217*a*, tree 218*a*, and profile selector 219*a*. According to particular embodiments, these display elements provide a cleaner, more efficient interface to client 102 without requiring presentation options to be communicated by data provider 106. For example, table 217*a* illustrates a spreadsheet with several columns and rows, with each intersection comprising a cell. These cells are automatically populated by data retrieved from one of the data providers 106. Example tree 218*a* illustrates a logical organization of data retrieved from data provider 106 and may include standard tree processing, such as expanding and collapsing. Profile selector 219*a* offers client 102 one or more presentation profiles 141 to select from. Based on this selection, server 104 automatically formats the retrieved data and, further, may temporarily or permanently associate the selected presentation profile with client 102.

FIGS. 2B-C illustrate another example customized data display 216. For example, FIG. 2B illustrates data display 216*b* that includes chart 217*b*, tree 218*b*, and profile selector 219*b*. In this example, presentation engine 130 retrieves data from data provider 106 and automatically formats the retrieved data into chart 217*b* based on presentation profile 141. Further, chart 217*b* includes figure-type selections that allow the user of client 102 to select the figure type such as chart, table, and line chart. Tree 218*b* allows the user to select different nodes in a logical tree. For example, if client 102 selects a different node from the one illustrated, presentation engine 130 may automatically retrieve different data from data provider 106 and present different information, in the same or different format, in data display 216*b*. The user may also select a different presentation profile 141 or modify the associated profile 141 using profile selector 219*b*, which normally effects the presentation of the data. For example, FIG. 2C illustrates data display 216*c*, which is substantially similar to data display 216*b*. In this embodiment, the retrieved data is similar but presentation engine 130 automatically formats the retrieved data into table 217*c*, as opposed to chart 217*b*. It will be understood that presentation engine 130 may present table 217*c* alternatively or in combination with chart 217*b* based on presentation profile 141 or a selection by client 102.

It will be understood that exemplary customized data display 116 (represented above by example data displays 216*a*, 216*b*, and 216*c*, respectively) is for illustration purposes only and may include none, some, or all of the illustrated presentation elements as well as additional presentation elements not shown.

Figure 3:
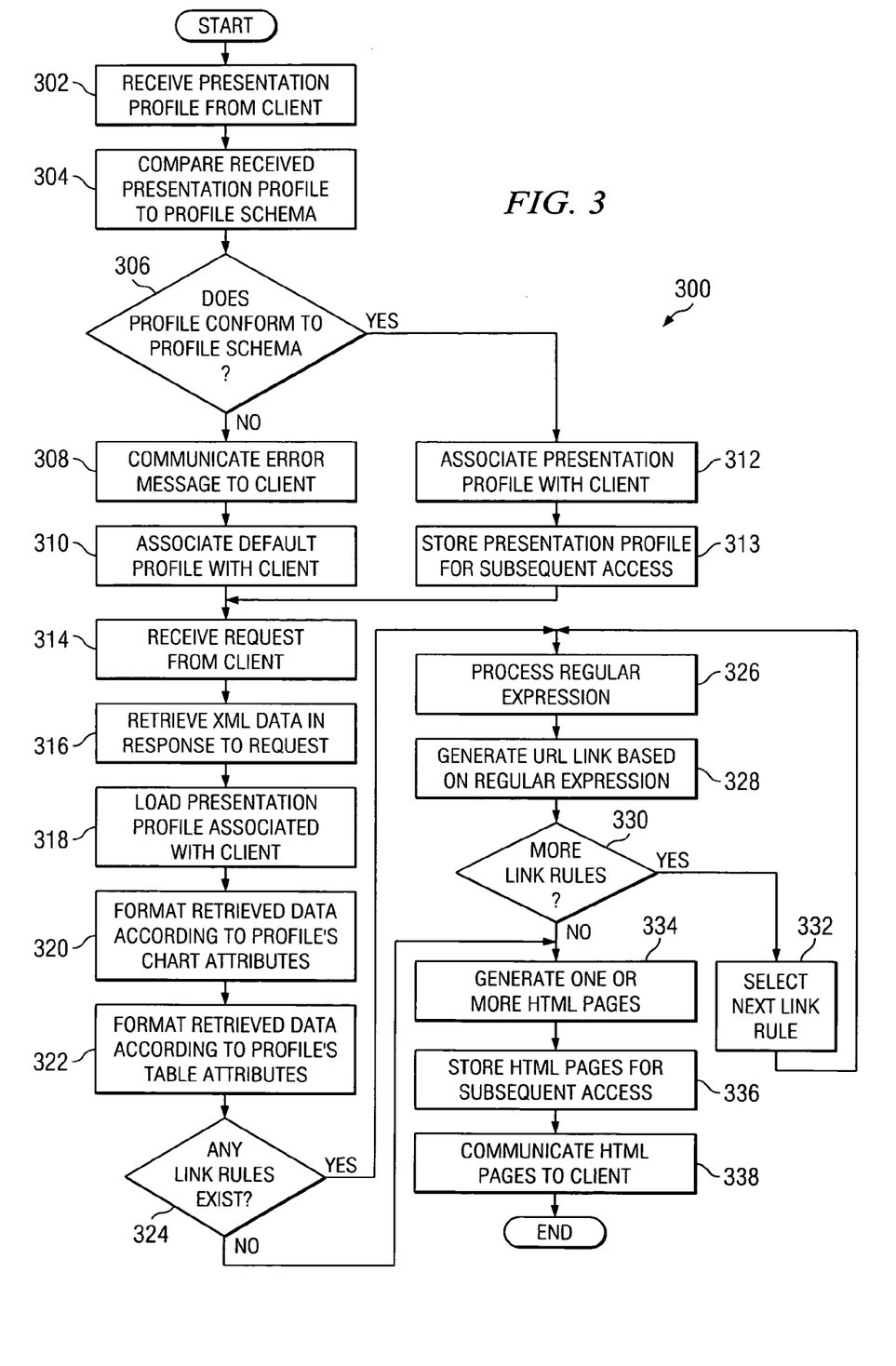
FIG. 3 is a flowchart illustrating an example method for customizing a data display using a presentation profile.

FIG. 3 illustrates a flow chart of an exemplary method 300 for presenting a customized data display 216 to client 102 using a presentation profile 141. Method 300 is described in respect to system 100. However, any other suitable system may use method 300 to create and provide customized data display 216 without departing from the scope of this disclosure. Generally, method 300 describes server 104 loading a presentation profile 141 associated with client 102 and creating customized data display 216 using the loaded presentation profile 141.

Server 104 receives presentation profile 141 from client 102 via network 108 at step 302. Of course, server 104 may also receive presentation profile 141 using any media or may allow client 102 to generate presentation profile 141 without departing from the scope of this disclosure. At step 304, presentation engine 130 compares the received presentation profile 141 to a profile schema, normally stored in memory 120. At decisional step 306, presentation engine 130 determines if presentation profile 141 conforms to the profile schema. If the presentation profile 141 does not conform to the profile schema, then server 104 communicates an error message to client 102 at step 308. According to one embodiment, presentation engine 130 associates a default presentation profile with client 102. In an alternative embodiment, presentation engine 130 may process the non-conforming presentation profile 141 such that it can conform to the profile schema without departing from the scope of this disclosure. Returning to decisional step 306, if presentation profile 141 conforms to the profile schema, then presentation engine 130 associates presentation profile 141 with client 102 using any appropriate characteristic or parameter at step 312. Once presentation profile 141 has been associated with client 102, then presentation engine 130 stores presentation profile 141 in presentation profile repository 140 for subsequent access by server 104 at step 313. Once a presentation profile 141 has been associated with client 102, then processing proceeds to steps 314 through 346 where an example client request 135 from client 102 is processed.

Server 104 receives client request 135 from client 102 at step 314. It will be understood that client 102 communicating client request 135 and client 102 communicating presentation profile 141 may be the same or different clients 102 without departing from the scope of this disclosure. Once client request 135 has been received by server 104, presentation engine 130 retrieves data 137 from a data provider 106 in response to the request. As described above, data provider 106 may comprise an internal or external computer or a process running on server 104 without departing from the scope of this disclosure. Next, at step 318, presentation engine 130 loads profile 141 associated with requesting client 102. Presentation engine 130 scans presentation profile 141 for chart attributes 142 and then formats the retrieved data according to those chart attributes at step 320. For example, presentation engine 130 may format the data into a pie chart, as defined by chart attribute 142, and appropriately determine the dimensions of individual components of the pie chart based on the retrieved data and presentation profile 141. Next, at step 322, presentation engine 130 performs similar processing using table attributes 142 stored in presentation profile 141. In another example, presentation engine 130 may create a spreadsheet, as defined by table attribute 142, and insert the retrieved data into the appropriate cells based on presentation profile 141. Once the charts and tables have been generated, presentation engine 130 processes link rule elements 142 stored in presentation profile in steps 324 through 332.

Presentation engine 130 processes presentation profile 141 and determines if any link rule elements 142 are stored in profile 141 at decisional step 324. If a link rule element 142 does exist, then presentation engine 130 processes the regular expression stored in the link rule. Using the result, presentation engine 130 generates the appropriate URL based on the regular expression at step 328. Presentation engine 130 determines if any additional link rules 142 exist in the loaded presentation profile 141 at decisional step 330. If more link rules 142 exist, then the next link rule is selected at step 332 and execution returns to step 326. Once there are no more link rules 142 either at decisional step 324 or decisional step 330, execution proceeds to step 334. At step 334, presentation engine 130 generates one or more HTML pages based on the formatted XML data. According to one embodiment, this generation may include transformation using eXtensible Stylesheet Language: Transformations (XSLT). Once the HTML pages have been generated, presentation engine 130 can, alternatively or in combination, store the generated HTML pages for subsequent access at step 336 or communicate the generated HTML pages to requesting client 102 at step 338.

The preceding flowchart and accompanying description illustrate only an example method 300 for server 104 to process presentation profile 141 and create customized data display 216 using the processed presentation profile 141. However, system 100 contemplates server 104 using any suitable technique for performing these tasks. Thus, many of the steps in this flowchart may take place simultaneously and/or in different orders than as shown. Moreover, server 104 may use methods with additional steps, fewer steps, and/or different steps, so long as the methods remain appropriate.

Although the present disclosure has been described in detail, it should be understood that various changes, substitutions and alterations can be made hereto without departing from the sphere and scope of the disclosure as defined by the appended claims.

What is claimed is:

1. A method for customizing a data display using a presentation profile, comprising:
   retrieving eXtensible Markup Language (XML) data from a remote data provider in response to a request from a client;
   loading a presentation profile based on at least one characteristic of the client, the presentation profile operable to be customized by the client and comprising a plurality of presentation attributes, at least one of the presentation attributes operable to identify a subset of the XML data and identify an associated graphical element based on the identified subset;
   formatting the XML data into a data display based on the presentation profile;
   processing a regular expression stored in the presentation profile;
   generating a HyperText Markup Language (HTML) link in the data display based on the regular expression; and
   communicating the data display to the client.

2. The method of claim 1 further comprising generating at least one HyperText Markup Language (HTML) page for the data display and wherein formatting the XML data into a data display based on the presentation comprises formatting the HTML page based on the presentation profile.

3. The method of claim 2, further comprising loading an XSL Stylesheet based on the presentation profile and wherein the HTML is at least partially generated through eXtensible Stylesheet Language: Transformation (XSLT).

4. The method of claim 1, the presentation attributes comprising at least one table attribute and at least one chart attribute and the method further comprising:
   inserting a table into the data display based on the table attribute;
   populating a chart with at least a portion of the retrieved XML data;
   inserting the chart into the data display based on the chart attribute; and
   populating the chart with at least a portion of the retrieved XML data.

5. The method of claim 1, further comprising:
   receiving the presentation profile from the client; and
   storing the presentation profile for subsequent loading.

6. The method of claim 5, further comprising:
   comparing the received presentation profile to a profile schema;
   in response to the received profile conforming to the profile schema, storing the profile for subsequent access; and
   in response to the received profile not conforming to the profile schema:
      communicating a deny profile message to the client; and
      automatically associating a default presentation profile with the client.

7. A system for customizing a data display using a presentation profile comprising:
   memory operable to store a plurality of presentation profiles;
   one or more processors collectively operable to:
      retrieve eXtensible Markup Language (XML) data from a remote data provider in response to a request from a client;
      load one of the presentation profiles based on at least one characteristic of the client, the presentation profile operable to be customized by the client and comprising a plurality of presentation attributes, at least one of the presentation attributes operable to identify a subset of the XML data and identify an associated graphical element based on the identified subset;
      format the XML data into a data display based on the presentation profile;
      process a regular expression stored in the presentation profile;
      generate a HyperText Markup Language (HTML) link in the data display based on the regular expression; and
      communicate the data display to the client.

8. The system of claim 7, the one or more processor further operable to generate at least one HyperText Markup Language (HTML) page for the data display and wherein the one or more processors operable to format the XML data into a data display based on the presentation profile comprise one or more processors operable to form the HTML page based on the presentation profile.

9. The system of claim 8, the one or more processors operable to load an XSL stylesheet based on the presentation profile and wherein the HTML is generated through eXtensible Stylesheet Language: Transformation (XSLT).

10. The system of claim 7, the presentation profile comprising at least one table attribute and at least one chart attribute and the one or more processors further operable to:
    insert a table into the data display based on the table attribute;
    populate a chart with at least a portion of the retrieved XML data;
    insert the chart into the data display based on the chart attribute;
    process a regular expression stored in the presentation profile;
    generate a HTML link in the data display based on the regular expression; and
    populate the chart with at least a portion of the retrieved XML data.

11. The system of claim 7, the one or more processor further operable to:
    receive the presentation profile from the client; and
    store the presentation profile in memory for subsequent loading.

12. The system of claim 11, the one or more processors further operable to:
  compare the received presentation profile to a profile schema;
  in response to the received profile conforming to the profile schema, store the presentation profile in memory for subsequent access; and
  in response to the received profile not conforming to the profile schema:
    communicate a deny profile message to the client; and
    automatically associate a default profile with the client.

13. A system for customizing a data display using a presentation profile, comprising:
  means for retrieving eXtensible Markup Language (XML) data from a remote data provider in response to a request from a client;
  means for loading a presentation profile based on at least one characteristic of the client, the presentation profile operable to be customized by the client and comprising a plurality of presentation attributes, at least one of the presentation attributes operable to identify a subset of the XML data and identify an associated graphical element based on the identified subset;
  means for formatting the XML data into a data display based on the presentation profile;
  means for processing a regular expression stored in the presentation profile;
  means for generating a HTML link in the data display based on the regular expression; and
  means for communicating the data to the client.

* * * * *